United States Patent
Connolly et al.

(10) Patent No.: US 12,203,803 B2
(45) Date of Patent: Jan. 21, 2025

(54) SENSOR ARRAYS FOR A SMART SHELF

(71) Applicant: ZEBRA TECHNOLOGIES CORPORATION, Lincolnshire, IL (US)

(72) Inventors: Sean Connolly, Stony Brook, NY (US); David Bellows, Old Westbury, NY (US); Russell Calvarese, Stony Brook, NY (US)

(73) Assignee: Zebra Technologies Corproation, Lincolnshire, IL (US)

( * ) Notice: Subject to any disclaimer, the term of this patent is extended or adjusted under 35 U.S.C. 154(b) by 310 days.

(21) Appl. No.: 17/703,064

(22) Filed: Mar. 24, 2022

(65) Prior Publication Data

US 2023/0304846 A1     Sep. 28, 2023

(51) Int. Cl.
   *G01G 19/52*     (2006.01)
   *G06Q 10/087*    (2023.01)

(52) U.S. Cl.
   CPC ........... *G01G 19/52* (2013.01); *G06Q 10/087* (2013.01)

(58) Field of Classification Search
   CPC ... G01G 19/52; G01G 19/4144; G06Q 10/087
   USPC .......................................... 277/596; 177/132
   See application file for complete search history.

(56) References Cited

U.S. PATENT DOCUMENTS

| | | | | |
|---|---|---|---|---|
| 1,012,121 | A * | 12/1911 | Beauchesne, Jr. | F16L 37/1215 285/34 |
| 6,903,656 | B1 * | 6/2005 | Lee | G06K 7/10316 340/572.1 |
| 7,614,555 | B2 * | 11/2009 | Sullivan | G06K 7/0008 235/487 |
| 9,727,838 | B2 * | 8/2017 | Campbell | G06Q 10/087 |
| 10,318,919 | B2 * | 6/2019 | Bermudez Rodriguez | G06Q 10/087 |
| 10,845,258 | B2 * | 11/2020 | Cohen | G06F 3/0414 |
| 11,295,252 | B2 * | 4/2022 | Setchell | G06Q 10/087 |
| 11,423,354 | B2 * | 8/2022 | Connolly | G06K 7/1413 |
| 11,729,559 | B2 * | 8/2023 | Sennaroglu | H04R 25/606 381/315 |
| 2013/0024023 | A1 | 1/2013 | Siegel et al. | |

(Continued)

FOREIGN PATENT DOCUMENTS

KR     100812288 B1     3/2008

OTHER PUBLICATIONS

International Search Report and Written Opinion for International Application No. PCT/US2023/15443 mailed on Jul. 19, 2023.

*Primary Examiner* — Jacques M Saint Surin (57) ABSTRACT

In some implementations, a system may activate sensors of a smart shelf based on detected events. The system may include a first sensor array configured to monitor a surface of the smart shelf. The first sensor array may be associated with a first type of sensor. The system may include a second sensor array configured to monitor the surface of the smart shelf. The second sensor array may be associated with a second type of sensor. The system may include a controller. The controller may receive, from a first sensor of the first sensor array, a first sensor value. The controller may detect an occurrence of an event based on the first sensor value, wherein the event is associated with an item of the smart shelf. The controller may activate one or more second sensors of the second sensor array based on the occurrence of the event.

18 Claims, 4 Drawing Sheets

(56) References Cited

U.S. PATENT DOCUMENTS

| | | |
|---|---|---|
| 2016/0084869 A1 | 3/2016 | Yuen et al. |
| 2021/0158430 A1 | 5/2021 | Buibas et al. |
| 2021/0182922 A1 | 6/2021 | Zheng et al. |

* cited by examiner

SENSOR ARRAYS FOR A SMART SHELF

BACKGROUND

A smart shelf may be a physical structure used to hold items in a brick-and-mortar retail store, a factory, a warehouse, or another suitable location. The smart shelf may use electronics to automatically track an inventory of items on the smart shelf. For example, the smart shelf may use sensors (e.g., weight sensors or force sensors), which may be installed within the smart shelf or underneath the smart shelf, to track the inventory of items on the smart shelf. The smart shelf may be able to determine, using the sensors, whether items are removed from the smart shelf, and/or whether items are added to the smart shelf, which may be used for inventory management purposes.

SUMMARY

Some implementations described herein relate to a system for activating sensors of a smart shelf based on detected events. The system may include a first sensor array configured to monitor a surface of the smart shelf, wherein the first sensor array is associated with a first type of sensor. The system may include a second sensor array configured to monitor the surface of the smart shelf, wherein the second sensor array is associated with a second type of sensor. The system may include a controller configured to receive, from a first sensor of the first sensor array, a first sensor value. The controller may be configured to detect an occurrence of an event based on the first sensor value, wherein the event is associated with an item of the smart shelf. The controller may be configured to activate one or more second sensors of the second sensor array based on the occurrence of the event.

Some implementations described herein relate to a method for activating sensors associated with a smart shelf. The method may include receiving, at a controller associated with a smart shelf, a first sensor value from a first sensor of a first sensor array associated with the smart shelf. The method may include detecting, at the controller, an occurrence of an event based on the first sensor value, wherein the event is associated with an item of the smart shelf. The method may include activating, by the controller and based on the occurrence of the event, one or more second sensors of a second sensor array associated with the smart shelf.

Some implementations described herein relate to a tangible machine-readable medium that stores a set of instructions for a device. The set of instructions, when executed by one or more processors of the device, may cause the device to receive, at a controller associated with a smart shelf, an optical sensor value from an optical sensor of an optical sensor array. The set of instructions, when executed by one or more processors of the device, may cause the device to detect, at the controller, an occurrence of an event based on a change between the optical sensor value and a previous sensor value satisfying a threshold. The set of instructions, when executed by one or more processors of the device, may cause the device to activate, by the controller and based on the occurrence of the event, one or more force sensors of a force sensor array associated with the smart shelf, wherein the one or more force sensors are within a defined distance from the optical sensor.

DETAILED DESCRIPTION

The following detailed description of example implementations refers to the accompanying drawings. The same reference numbers in different drawings may identify the same or similar elements.

Automatic inventory management may be achieved using smart shelf technology. A smart shelf may be installed in a retail/supermarket environment, such as in a brick-and-mortar retail store. The smart shelf may also be installed in a factory, a warehouse, or another suitable location that stores items. The smart shelf may use electronics to automatically track an inventory of items on the smart shelf. Sensors (e.g., weight sensors or force sensors) may be installed within the smart shelf or underneath the smart shelf. The smart shelf may determine, using the sensors, whether items are removed from the smart shelf, and/or whether items are added to the smart shelf. Other approaches to automatic inventory management involve robotic systems and shelf-mounted camera-based systems.

Traditional smart shelves have used one of two approaches. A first approach may involve using a high-resolution force sensitive resistive (FSR) matrix on the smart shelf. The FSR matrix may include a high-resolution shelf sensor. The high-resolution shelf sensor may also be referred to as a weight sensor or a force sensor. The high-resolution shelf sensor may include a series of high-density copper, or otherwise electrically conductive, traces arranged in rows in a first layer, a series of high-density copper, or otherwise electrically conductive, traces arranged in columns in a second layer, and an FSR layer disposed between the traces of the first and second layers. Items on the high-resolution shelf sensor may create low resistance at row/column intersections of the copper traces due to an item's weight. Low resistance points may result in an approximation of a shape of an item on the high-resolution shelf sensor. The low resistance points may allow for item shape detection. The high-resolution shelf sensor may periodically and continually collect samples to enable the item shape detection. A grid resolution for the high-resolution shelf sensor may be on the order of a 0.1 inch to 0.2 inch spacing in both a vertical domain (column) and a horizontal domain (row). The grid resolution for the high-resolution shelf sensor may result in a high accuracy item count, in relation to an accuracy of an item count performed by the low-resolution shelf sensor, due to an ability to detect item shapes.

A second approach may involve using a low-resolution shelf sensor on the smart shelf. The low-resolution shelf sensor may include an array of photo sensors (also referred to as optical sensors or light sensors). The array of photo sensors may be a 0.5 inch to 1 inch array of sensing photo sensors, such as cadmium sulfide sensors. In some cases, the array of photo sensors may be a greater than 1 inch array of sensing photo sensors. The low-resolution shelf sensor may detect an amount of light, which may indicate a light blockage. The light blockage may indicate a presence of an item that is fully or partially covering the low-resolution shelf sensor. Alternatively, the amount of light may indicate no light blockage or minimal light blockage, which may indicate an absence of the item on the smart shelf. The low-resolution shelf sensor may periodically and continually collect samples of light levels.

"High-resolution" and "low-resolution" may refer to a density of sensors on the smart shelf. For example, high-resolution shelf sensors may be associated with a high density of sensors as compared to low-resolution shelf sensors. In other words, the smart shelf may have a high number of high-resolution shelf sensors (e.g., force sensors) as compared to low-resolution shelf sensors (e.g., optical sensors).

The first approach involving high-resolution shelf sensors and the second approach involving low-resolution shelf sensors both have various advantages and disadvantages. The high-resolution shelf sensors may provide high accuracy item counts, in relation to the low-resolution shelf sensors, due to the ability to enable item shape detection. However, the high-resolution shelf sensors may consume a greater amount of power as compared to the low-resolution shelf sensors. High-resolution and high accuracy automatic inventory management may only be needed for a relatively small percentage of time, and consequently, during those times when high accuracy is not needed, a significant amount of power may be consumed for needless processing with little added benefit. Further, because of the high power requirements associated with the high-resolution shelf sensors, the high-resolution shelf sensors are often powered and communicate via wired connections to the smart shelf. Such wires may be easily damaged while items are added to or moved on the smart shelf, such as when retail store personnel are stocking items on the smart shelf or store customers are taking items from the smart shelf.

The low-resolution shelf sensors may require only a low power but provide low accuracy item counts, as compared to the high-resolution shelf sensors. The low-resolution shelf sensors may enable more frequent item counts, as compared to the high-resolution shelf sensors, due to the low power requirement associated with the low-resolution shelf sensors. In addition, the low-resolution shelf sensors may more accurately detect lightweight (as opposed to heavy) items since an optical sensor, for example, does not rely on the item's weight for its detection by the sensor, as compared to the high-resolution shelf sensors. When considering that lightweight items are more easily detected using an optical sensor than a force sensor, in the case of lightweight items, more accurate item counts may be achieved for low-resolution shelf sensors.

The high-resolution shelf sensors may, in general, provide high accuracy item counts but may consume an inordinate amount of power, whereas the low-resolution shelf sensors consume less power but provide low accuracy item counts. Thus, there is a need for a smart shelf that provides high-resolution shelf sensors that enable high accuracy item counts, but operates using a low amount of power typically associated with low-resolution shelf sensors.

To solve the problems described above, as well as to improve item count accuracy while satisfying certain power constraints, a technical solution is described herein for a hybrid sensor shelf that combines both high-resolution shelf sensors (e.g., force sensors) and low-resolution shelf sensors (e.g., optical sensors). In a default setting, the low-resolution shelf sensors may operate in a continuous manner, and the high-resolution shelf sensors may be disabled to conserve power. When sensor data associated with the low-resolution shelf sensors satisfies certain criteria, an event may be detected and the high-resolution shelf sensors may be activated to capture sensor data. The event may involve an item being removed from the smart shelf, the item being added on the smart shelf, or the item being moved between locations on the smart shelf. Since the high-resolution shelf sensors may consume more power than the low-resolution shelf sensors, the high-resolution shelf sensors may only be activated based on the sensor data associated with the low-resolution shelf sensors satisfying the criteria. The sensor data associated with the high-resolution shelf sensors may provide a more accurate item count as compared to the sensor data associated with the low-resolution shelf sensors. After a certain period of time, the high-resolution shelf sensors may be disabled again to conserve power. As a result, the low-resolution shelf sensors may be used to trigger an operation of the high-resolution shelf sensors.

In some implementations, the smart shelf may have both high-resolution shelf sensor and low-resolution shelf sensor capabilities, but may only deploy the high-resolution shelf sensors when needed, which may provide various benefits. The smart shelf may be able to operate using battery power or harvested energy due to reduced power requirements, which may eliminate wiring in, to, and/or from the smart shelf and reduce a likelihood of the wiring becoming damaged during routine retail store operations (e.g., stocking items on the smart shelf). In addition to reducing the maintenance cost, eliminating the wiring may also reduce the installation cost for the smart shelf. The ability for the smart shelf to operate at a lower power may be a result of the high-resolution shelf sensors not continuously running, but rather only running when triggered by the low-resolution shelf sensors. The smart shelf may provide more frequent item counts using the low-resolution shelf sensors, due to the lower power requirement associated with the low-resolution shelf sensors. When triggered, the smart shelf may also provide high accuracy item counts using the high-resolution shelf sensors. The smart shelf may also be able to accurately detect light items using the low-resolution shelf sensors. Smart shelves that deploy only high-resolution shelf sensors or low-resolution shelf sensors are not capable of achieving all of these functions.

Figure 1:
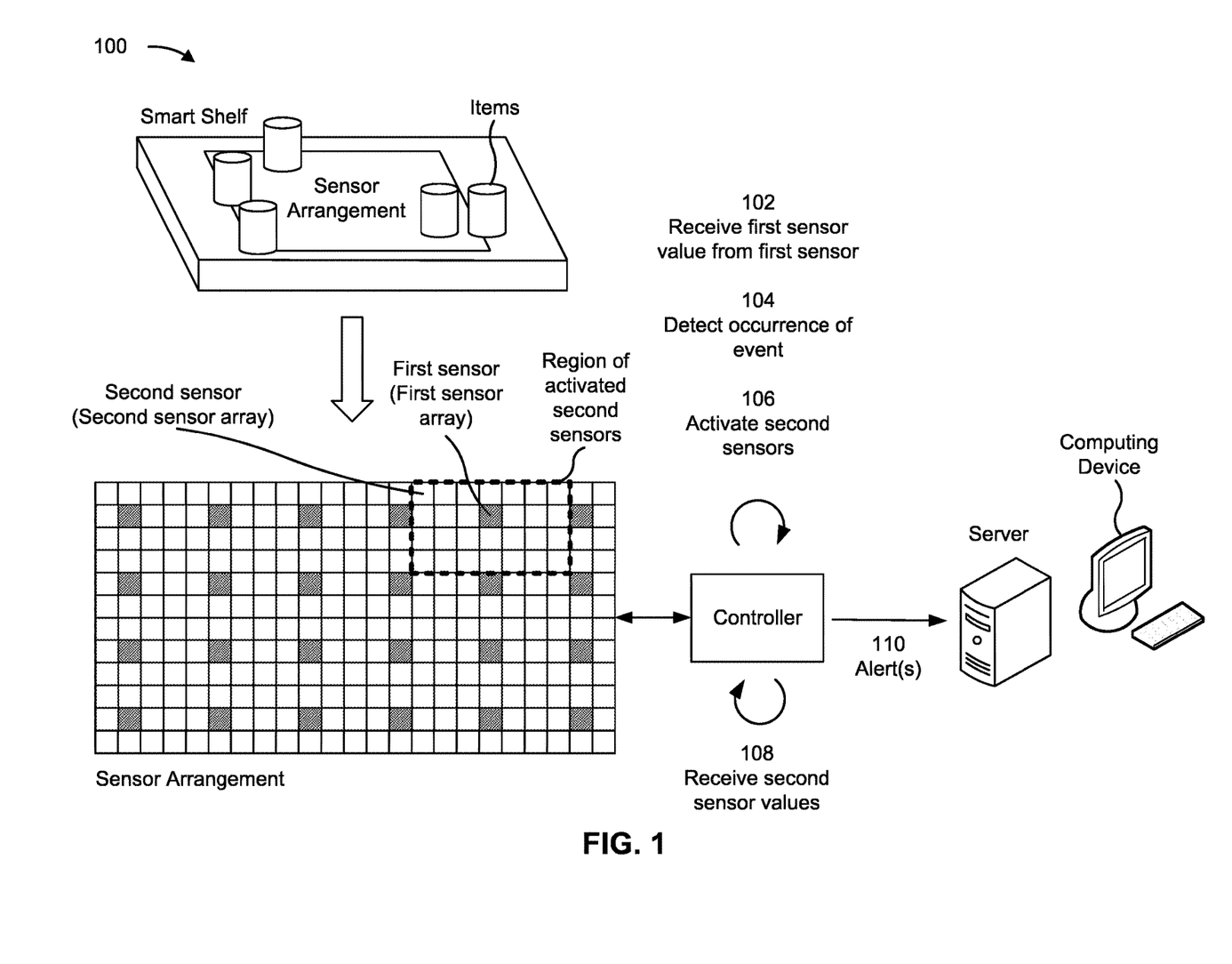
FIG. 1 is a diagram of an example implementation associated with a sensor arrangement associated with a smart shelf, as described herein.

FIG. 1 is a diagram of an example implementation 100 associated with a sensor arrangement associated with a smart shelf, as described herein. As shown in FIG. 1, example implementation 100 includes the smart shelf, the sensor arrangement, and a server. These devices are described in more detail below in connection with FIG. 2 and FIG. 3.

In some implementations, the smart shelf may hold a plurality of items (e.g., products for sale). The smart shelf may include the sensor arrangement. The sensor arrangement may include a first sensor array configured to monitor a surface of the smart shelf. The first sensor array may be associated with a first type of sensor. The first sensor array may be associated with low-resolution shelf sensors, such as optical sensors (e.g., cadmium sulfide sensors). The first sensor array may be associated with a relatively low density of optical sensors. The first sensor array may include optical sensors that detect amounts of light and changes in amounts of light, which may be used to indicate the presence of items on the smart shelf or the absence of items on the smart shelf. The first sensor array may be powered using a battery or harvested energy.

In some implementations, the sensor arrangement may include a second sensor array configured to monitor the surface of the smart shelf. The second sensor array may be associated with a second type of sensor. The second sensor array may be associated with high-resolution shelf sensors, such as force sensors (or weight sensors). The second sensor array may be associated with a relatively high density of force sensors. The second sensor array may be a force sensor array. The second sensor array may be associated with an FSR matrix on the smart shelf, which may be used for item shape detection and item counts. The second sensor array may be powered using a battery or harvested energy. Further, a power usage associated with the first sensor array may be less than a power usage associated with the second sensor array.

In some implementations, the sensor arrangement may be associated with a controller. The controller may include detection circuitry to receive sensor values from the first sensor array and the second sensor array. The controller may communicate with the first sensor array and the second sensor array via a wired connection or via a wireless connection. The controller may receive the sensor values by sampling the first sensor array and the second sensor array. The controller may activate or deactivate the first sensor array. The controller may activate or deactivate the second sensor array. The controller may configure certain parameters for the first sensor array and/or the second sensor array. The controller may transmit information to the server based on the sensor values received from the first sensor array and the second sensor array. The server may be associated with a brick-and-mortar retail store, a factory, a warehouse, or another suitable entity.

In some implementations, the first sensor array may be associated with a first grid and the second sensor array may be associated with a second grid. The first grid and the second grid may share the controller, but some electronic components (e.g., microcontrollers and/or amplifiers) may be duplicated between the first grid and the second grid. In some implementations, the first sensor array and the second sensor array may be associated with a same grid, which may allow electronic components to be shared between the first grid and the second grid. In a specific example, the first sensor array (e.g., an optical sensor array) may be printed or applied directly onto a same substrate as the second sensor array (e.g., a force sensor array), and may be connected using a copper layer, similar to the second sensor array, to the controller. Although the first sensor array and the second sensor array may share the same grid, the first sensor array may be independently controlled from the second sensor array. In other words, the controller of the smart shelf may perform an activation or deactivation of the first sensor array, which may be separate from an activation or deactivation of the second sensor array.

As shown by reference number 102, the controller may receive, from a first sensor of the first sensor array, a first sensor value. The first sensor may be an optical sensor, the first sensor array may be an optical sensor array, and the first sensor value may be an optical sensor value. The first sensor value may indicate a detected amount of light associated with the first sensor. The detected amount of light may correspond to a presence of an item on the smart shelf, or the detected amount of light may correspond to an absence of an item on the smart shelf. In some implementations, the controller may periodically and continually receive first sensor values from the first sensor.

As shown by reference number 104, the controller may detect an occurrence of an event based on the first sensor value. The controller may detect the event based on a change between the first sensor value and a previous sensor value satisfying a threshold. The controller may compare the first sensor value received from the first sensor with previous sensor values received from the first sensor. When a change or difference between the first sensor value and the previous sensor values satisfies the threshold, the controller may detect the occurrence of the event. The event may be associated with the item being removed from the smart shelf, the item being placed on the smart shelf, or the item being moved between locations on the smart shelf.

As an example, the controller may initially receive the previous sensor value from the first sensor, which may indicate a presence of an item (e.g., an amount of detected light may be relatively low due to the item being placed on top of the first sensor). The controller may receive a later sensor value from the first sensor. The controller may detect an occurrence of an event when the later sensor value is different from the previous sensor value by a value threshold. The later sensor value may indicate an absence of the item (e.g., an amount of detected light may be relatively high due to the item being removed and no longer being on top of the first sensor).

As shown by reference number 106, the controller may activate second sensors (or one or more second sensors) of the second sensor array based on the occurrence of the event. The second sensors may be force sensors. When activated, the second sensors may transition from an off state or a low power state to an on state. By activating the second sensors, the controller may trigger the second sensors to capture second sensor values associated with the surface of the smart shelf. The second sensor values may be force sensor values. The second sensor values may be associated with a higher item count accuracy as compared to an item count accuracy of first sensor values captured by the first sensor array. Further, when the second sensors are activated, the controller may or may not deactivate first sensors of the first sensor array.

In some implementations, the controller may identify the second sensors based on a distance between the second sensors and the first sensor satisfying a threshold. Other second sensors that are outside of that distance may not be activated. In other words, the controller may identify second sensors of the second sensor array that are located in proximity to the first sensor, and the controller may only activate those second sensors and no other second sensors associated with the second sensor array. As a result, only a region of the smart shelf that is associated with the occurrence of the event may be sampled using the second sensors, which may conserve power by not unnecessarily activating the other second sensors associated with the second sensor array.

In some implementations, the controller may receive multiple first sensor values from multiple sensors of the first sensor array. The controller may detect, based on the multiple first sensor values, multiple events that satisfy a threshold. The controller may activate the second sensors based on the detection of the multiple events.

As an example, one individual first sensor value that causes an event detection may not trigger the activation of the second sensors. Rather, multiple sensor values that each cause multiple event occurrences may trigger the activation of the second sensors.

In some implementations, the controller may receive a plurality of first sensor values from a plurality of sensors of the first sensor array. The controller may detect, based on the plurality of first sensor values, a plurality of events that satisfies a threshold. The plurality of events may occur within a defined period of time. The controller may activate a plurality of second sensors (e.g., all second sensors) of the second sensor array based on the detection of the plurality of events. The plurality of second sensors may not all necessarily be in proximity (e.g., adjacent) to the first sensor.

As an example, numerous first sensor values that cause numerous event detections may be indicative of a situation that is not necessarily constrained to only one region of the smart shelf. In this case, when the number of event detections within a defined period of time satisfies a threshold, the controller may activate all second sensors (e.g., an entire force sensor array) to obtain an accurate item count of the entire smart shelf. As a result, numerous regions of the smart shelf may be scanned using the second sensor array. When performing a scan, the controller may sample (or collect) second sensor values from the second sensor array, and the sensor values may be used to perform a more accurate item count of the smart shelf.

As another example, the first sensor array may be used to detect a change in a front left section of the smart shelf, which may trigger the second sensor array to scan the front left section of the smart shelf. The second sensor array may not continuously scan the front left section, but rather may only scan the front left region based on the trigger from the first sensor array. The second sensor array may perform a more accurate item count of the front left section as compared to the first sensor array. The more accurate item count of the front left section is likely to be different from a previous item count of the front left section, since the first sensor array indicated that the change was detected in the front left section of the smart shelf. The controller may determine a location (e.g., the front left section) of first sensors of the first sensor array that detect the change, and the controller may instruct corresponding second sensors of the second sensor array to perform the more accurate item count in that location. In some cases, other first sensors of the first sensor array may detect other changes in a front middle section of the smart shelf and in a front right section of the smart shelf. When a number of changes (or event detections) within a specified time period satisfies a threshold, the controller may trigger the second sensor array to scan an entire area of the smart shelf. For example, the controller may trigger the second sensor array to scan the front left section, the front middle section, and the front right section of the smart shelf. In this case, even though the scan using the second sensor array may consume a high amount of power, the number of changes may warrant scanning the entire area of the smart shelf.

As yet another example, the controller may detect multiple events based on multiple first sensor values received from multiple sensors of the first sensor array. The multiple events may not necessarily result from items that are removed from the smart shelf or items that are added to the smart shelf. Rather, the multiple events may be due to numerous items that are moved around within the shelf, which may be referred to as customer reach activity (e.g., customers reach for the items, may remove the items from the smart shelf, but may often place the items back on the smart shelf not necessarily in the same location they were each removed from). Customer reach activity may result in the same inventory of items, since items are mostly not removed from the smart shelf. However, an inordinate amount of reach activity may be an indication that items are not properly placed on the smart shelf, items are in wrong places on the smart shelf, or other problems. Thus, in this case, the controller may activate the second sensors of the second sensor array to perform a scan of the smart shelf. The scan may provide additional information regarding the items on the smart shelf, and this additional information may be used by retail store employees to adjust items on the smart shelf if needed.

As shown by reference number 108, the controller may receive, from the second sensors, the second sensor values. The second sensor values may be force sensor values. The second sensor values may be associated with a high item count accuracy as compared to the first sensor values. The second sensor values may indicate item shapes instead of light (or associated brightness) changes associated with the presence or absence of items, which may result in the high item count accuracy.

In some implementations, the controller may receive the second sensor values, and the controller may determine, from the second sensor values, that the second sensors are unable to detect the item. The second sensor values may not be indicative of an item detection. The item may be detected by using the first sensor array, but the second sensor array may not detect the item, which may indicate that the item is a lightweight item. A lightweight item may have a weight that is below some threshold and, as a result, may be less likely to be detected by the second sensor array. Lightweight items may not push second sensors of the second sensor array enough to enable a detection of the lightweight items. On the other hand, since the first sensor array is able to detect blockages of light, the first sensor array may be able to detect items regardless of whether the items are relatively lightweight or relatively heavy.

In this case, the controller may perform one of two options. In a first option, the controller may configure updated parameters (e.g., an updated dynamic range parameter) for the second sensor array. The updated parameters may enable the second sensors to detect the lightweight item. The updated parameters may be more finetuned for detecting lightweight items, as opposed to more general default parameters that are targeted for detecting a wide range of different items on the smart shelf. In a second option, the controller may instruct the second sensors to pause operation for a period of time, since a scan by the second sensors will not accurately reflect items on the smart shelf anyway. Rather than unnecessarily performing the scan and outputting inaccurate second sensor values, the second sensors may be temporarily turned off to conserve power.

As shown by reference number 110, the controller may transmit, to the server, one or more alerts. A first alert may indicate information based on the second sensor values. For example, the information may indicate a recommended number of items to place on the surface of the smart shelf based on the second sensor values. The controller may determine a number of items on the smart shelf (e.g., perform an item count) based on the second sensor values, and based on information regarding a total number of items that are supported by the smart shelf, the controller may determine a number of items that can potentially be added to the smart shelf. The recommended number of items, as indicated by the alert, may be based on the number of items that can potentially be added to the smart shelf. In some implementations, a computing device may receive, from the server, an indication of the recommended number of items to place on the surface of the smart shelf. A user associated with the computing device (e.g., a retail store employee) may perform an action based on the first alert.

In some implementations, a second alert may indicate the occurrence of the event. The second alert may indicate that the event occurred, as well as an event type. The second alert may indicate that the item was removed from the smart shelf. The second alert may indicate that the item was added to the smart shelf. The second alert may indicate that the item was moved between locations on the smart shelf. The second alert may indicate a recommendation depending on the event. When the event is associated with the item being removed from the smart shelf, the recommendation may involve adding another item (e.g., the same type of item) back to the smart shelf (e.g., restocking). When the event is associated with the item being moved around the smart shelf, the recommendation may involve rearranging the item on the smart shelf (e.g., moving the item from a back of the smart shelf to a front of the smart shelf, or lining up items in a straight line toward the front of the smart shelf, which also may be referred to as "leveling"). When the event is associated with the item being added to the smart shelf, the second alert may include an indication that the smart shelf is full and no additional items need to be added to the smart shelf. In some implementations, the computing device may receive, from the server, an indication of the event and/or the event type. The user associated with the computing device (e.g., the retail store employee) may perform an action based on the second alert.

As an example, the controller may determine, based on first sensor values received from the first sensor array, that no items are on a front section of the smart shelf. Other first sensor values may indicate that items are present on a back section of the smart shelf. The controller may transmit an alert, which may indicate a recommendation for the retail store employee to level the smart shelf. During a leveling, the retail store employee may move items from the back section of the smart shelf to the front section of the smart shelf, which may increase an item visibility to customers. In this example, the first sensor values are sufficient enough to determine that the smart shelf could be leveled, and no power is wasted by unnecessarily activating second sensors of the second sensor array. As another example, the controller may determine, based on the second sensor values, an item count of 10 items (e.g., 10 items are present on the smart shelf). The controller may determine, based on information stored in a data store, that an item capacity for the smart shelf is 30 items. The controller may determine, based on the item capacity of 30 items and the item count of 10 items, that up to 20 items can be added to the smart shelf. The controller may transmit an alert indicating that up to 20 items can be added to the smart shelf. Based on the alert, the retail store employee may add additional items to the smart shelf accordingly.

In some implementations, the controller may receive the plurality of first sensor values from the plurality of sensors of the first sensor array. The controller may detect, based on the plurality of first sensor values, the plurality of events that satisfies the threshold. The controller may not immediately activate the second sensors, despite the plurality of events that are detected. Rather, the controller may continue to receive first sensor values from the first sensor array, and the controller may determine when the plurality of events no longer satisfies the threshold. The controller may activate the second sensors after the plurality of events no longer satisfies the threshold. If the second sensors were to be activated sooner (e.g., when the plurality of events are occurring) and attempt to scan the smart shelf, the second sensor value sampling would be quickly outdated, which would trigger additional scanning using the second sensors, and a relatively large amount of power would be consumed. In other words, constantly occurring events would lead to continual operation of the second sensors, which would incur high power consumption without much additional benefit.

In some cases, the plurality of events (e.g., items added to the smart shelf, items removed from the smart shelf, and/or items rearranged on the smart shelf) may otherwise be interpreted by the second sensors as a potential theft of items on the smart shelf, but the detection of potential theft would be a false alarm. The potential theft of items may be referred to as a sweep event, and may occur when multiple items are removed from the smart shelf within a short time period. Instead of potential theft of items, the plurality of events may actually be due to normal operations (e.g., retail store employees restocking items on the smart shelf). In these cases, there may be no need to immediately activate the second sensors to obtain the second sensor values, since operating the second sensors may unnecessarily consume power. Thus, the controller may wait until a number of events within a time period decreases and then activate the second sensors to scan the smart shelf.

In some implementations, the controller may be able to detect continuous shelf activity using the first sensor values, without expending an inordinate amount of power. The controller may tag groups of first sensor values with timestamps, which may effectively create snapshots of the smart shelf at different points in time. A before snapshot may provide a first group of sensor values regarding items on the smart shelf prior to high shelf activity. The before snapshot may be the last time the second sensors were activated to get a high accuracy item count and location prior to the continuous shelf activity. After the shelf activity has reduced to a certain amount (e.g., a number of detected events within a given period satisfies a threshold) or subsided (e.g., zero detected events within a given period satisfies a threshold), the controller may activate the second sensors to perform a more accurate item count and location on the smart shelf. The controller may establish the scan at this timestamp as an after snapshot. The after snapshot may provide a second group of sensor values regarding items on the smart shelf and may be the first time the second sensors have been activated since the continuous shelf activity transpired. The controller may compare the second sensor values of the before snapshot and the second sensor values of the after snapshot, and based on the comparison, the controller may determine that additional items were added onto the smart shelf between the first snapshot and the second snapshot, items were removed from the smart shelf between the first snapshot and the second snapshot, or items were rearranged but a total item count did not change or minimally changed between the first snapshot and the second snapshot. When the second snapshot indicates a significant number of fewer items as compared to the first snapshot, the controller may detect a sweep event and trigger an alert indicating a potential theft. In some implementations, a computing device may receive, from the server, an indication of the potential theft. The user associated with the computing device (e.g., security personnel) may perform an action based on this potential theft indication. When the second snapshot indicates a significant number of additional items as compared to the first snapshot, the controller may detect a restocking event. When the second snapshot indicates items were rearranged but a total item count did not change or minimally changed as compared to the first snapshot, the controller may detect a leveling event. Being able to distinguish a sweep event from a restocking event or a leveling event minimizes incorrect triggering of theft alerts.

In some implementations, the first sensor array may, in addition to detecting the presence or absence of items on the smart shelf, detect light blockage (or a shadow) created when a person (e.g., a customer or a retail store employee) reaches into the smart shelf, as well as a subsequent disappearance of the light blockage (or a subsequent disappearance of the shadow) when the person pulls away from the smart shelf. The detected light blockage and the detected subsequent disappearance of the light blockage, which may also be referred to as a transient light blockage, may indicate an interaction with the smart shelf After the transient light blockage is detected (e.g., due to the person reaching into the smart shelf and pulling away from the smart shelf) and the interaction is complete, the second sensor array may be triggered to scan the smart shelf, since the detected transient light blockage may be indicative of an inventory change on the smart shelf as a result of the interaction.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
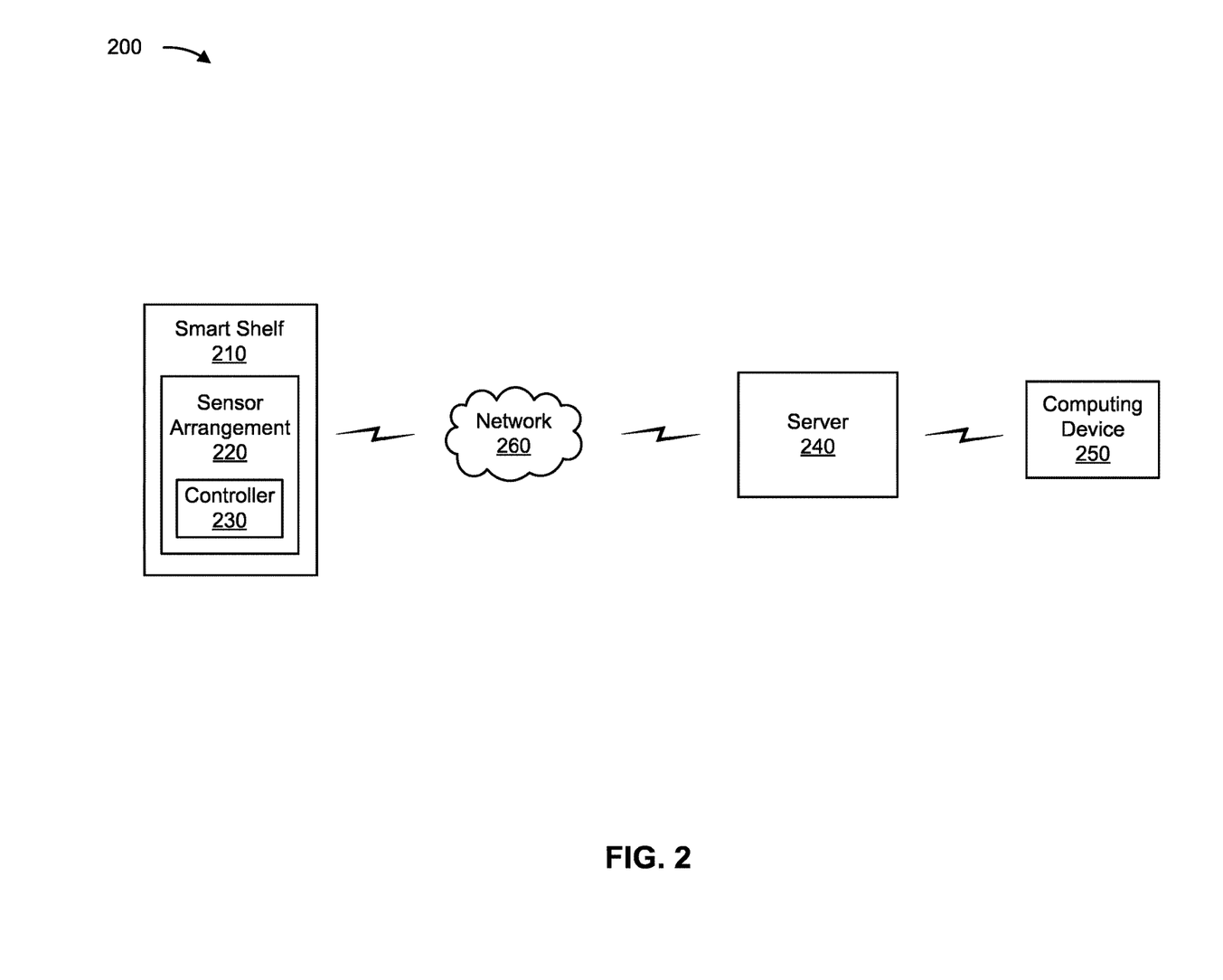
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a smart shelf 210, a sensor arrangement 220, a controller 230, a server 240, a computing device 250, and a network 260. Devices of environment 200 may interconnect via wired connections, wireless connections, or a combination of wired and wireless connections.

The smart shelf 210 may be a physical structure used to hold items in a brick-and-mortar retail store, a factory, a warehouse, or another suitable location. The smart shelf 210 may automatically track, using the sensor arrangement 220, an inventory of items on the smart shelf 210. The smart shelf 210 may determine whether items are removed from the smart shelf 210, whether items are added to the smart shelf 210, and/or whether items are moved between locations on the smart shelf 210.

The sensor arrangement 220 may include a first sensor array. The first sensor array may be associated with low-resolution shelf sensors, such as optical sensors. The sensor arrangement 220 may include a second sensor array. The second sensor array may be associated with high-resolution shelf sensors, such as force sensors. The sensor arrangement 220 may include a controller 230. The controller 230 may activate or deactivate the first sensor array. The controller 230 may activate or deactivate the second sensor array.

The server 240 includes one or more devices capable of receiving, generating, storing, processing, providing, and/or routing information associated with sensor arrays of the smart shelf 210, as described elsewhere herein. The server 240 may include a communication device and/or a computing device. For example, the server 240 may include a server, such as an application server, a client server, a web server, a database server, a host server, a proxy server, a virtual server (e.g., executing on computing hardware), or a server in a cloud computing system. In some implementations, the server 240 includes computing hardware used in a cloud computing environment.

The computing device 250 includes one or more devices capable of receiving, generating, storing, processing, and/or providing information associated with sensor arrays of the smart shelf 210, as described elsewhere herein. The computing device 250 may include a communication device. For example, the computing device 250 may include a wireless communication device, a user device (e.g., a mobile phone, a user equipment, a laptop computer, a tablet computer, a desktop computer), or a similar type of device.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
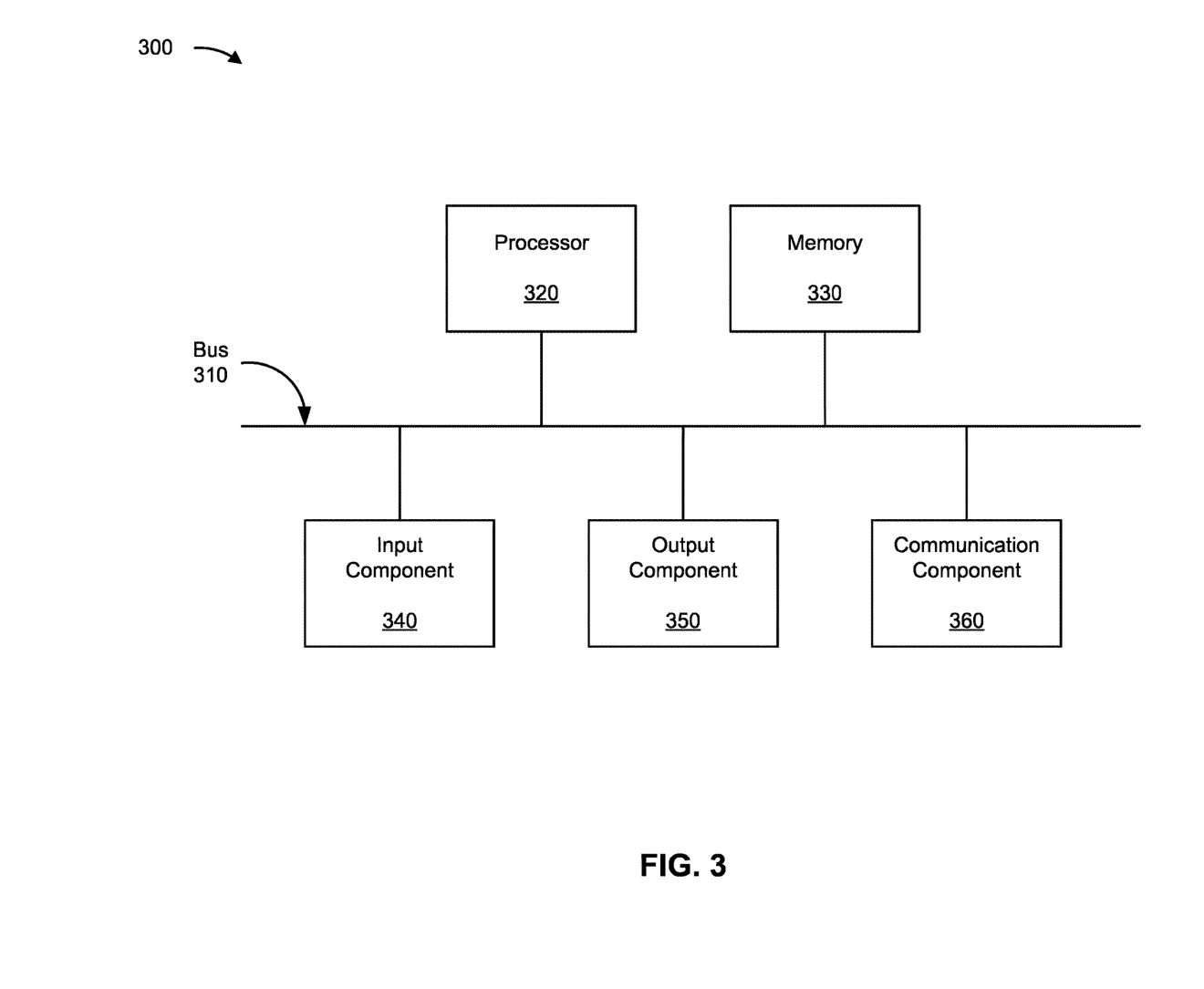
FIG. 3 is a diagram of example components of one or more devices of FIG. 2.

FIG. 3 is a diagram of example components of a device 300, which may correspond to the smart shelf 210, the sensor arrangement 220, the controller 230, the server 240 and/or the computing device 250. In some implementations, smart shelf 210, sensor arrangement 220, controller 230, server 240 and/or computing device 250 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
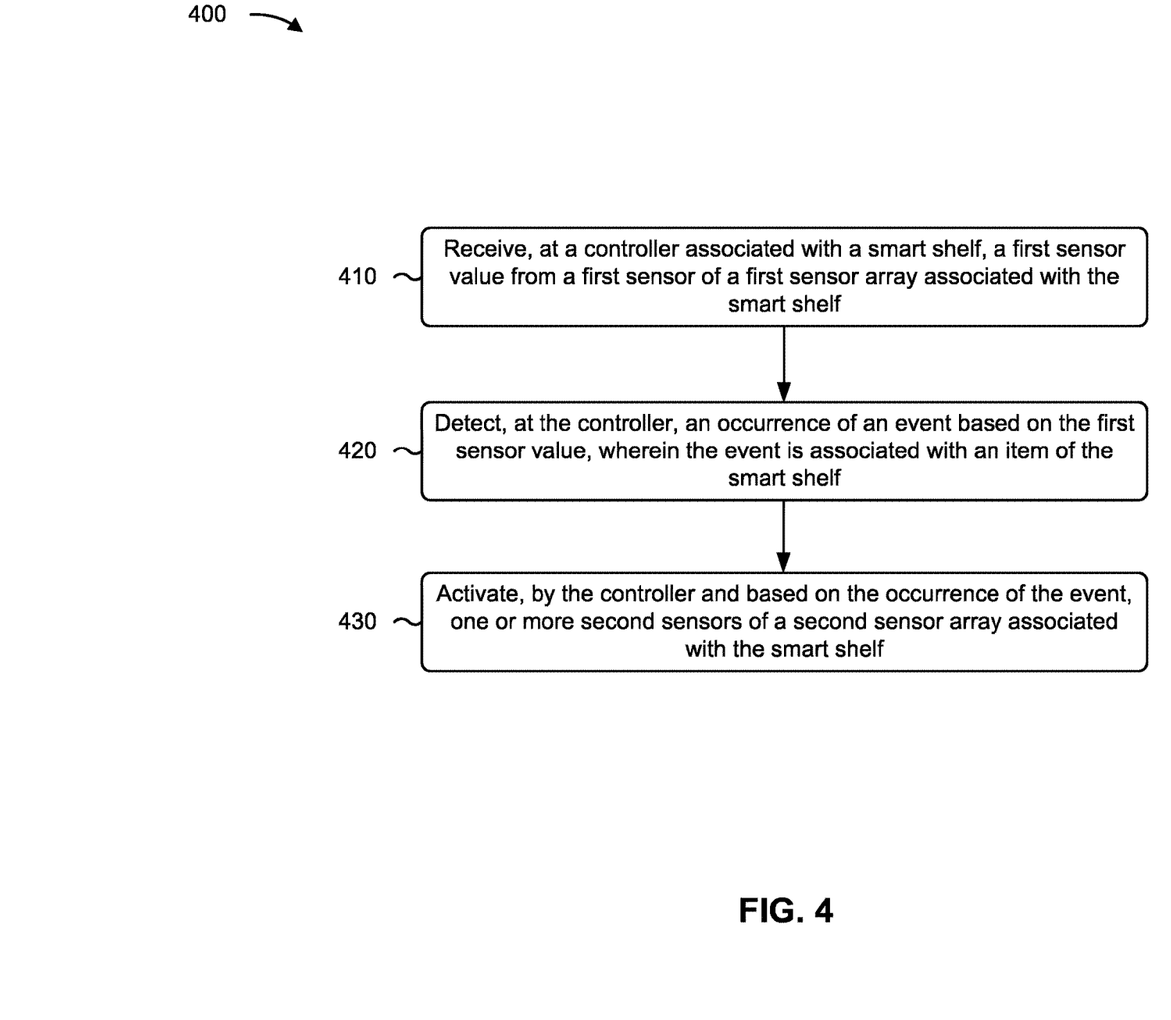
FIG. 4 is a flowchart of an example process associated with a system configuration for processing products.

FIG. 4 is a flowchart of an example process 400 associated with activating sensors associated with a smart shelf. In some implementations, one or more process blocks of FIG. 4 may be performed by a controller (e.g., controller 230). In some implementations, one or more process blocks of FIG. 4 may be performed by another device or a group of devices separate from or including the sensor arrangement, such as a server (e.g., server 240). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, at a controller associated with a smart shelf, a first sensor value from a first sensor of a first sensor array associated with the smart shelf (block 410). For example, the first sensor array may be associated with optical sensors, as described above.

As further shown in FIG. 4, process 400 may include detecting, at the controller, an occurrence of an event based on the first sensor value, wherein the event is associated with an item of the smart shelf (block 420). For example, the second sensor array may be associated with force sensors, as described above.

As further shown in FIG. 4, process 400 may include activating, by the controller and based on the occurrence of the event, one or more second sensors of a second sensor array associated with the smart shelf (block 430). For example, the controller may trigger the one or more second sensors to capture second sensor values associated with the surface of the smart shelf, where the second sensor values may be associated with a high item count accuracy as compared to first sensor values captured by the first sensor array, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for activating sensors of a smart shelf based on detected events, comprising:
    a first sensor array configured to monitor a surface of the smart shelf, wherein the first sensor array is associated with a first type of sensor;
    a second sensor array configured to monitor the surface of the smart shelf, wherein the second sensor array is associated with a second type of sensor; and
    a controller configured to:
        receive, from a first sensor of the first sensor array, a first sensor value;
        detect an occurrence of an event based on the first sensor value, wherein the event is associated with an item of the smart shelf;
        activate one or more second sensors of the second sensor array based on the occurrence of the event;
        receive, from the one or more second sensors, second sensor values;
        determine, from the second sensor values, that the one or more second sensors are unable to detect the item; and
        perform one or more of:
            configure an updated dynamic range parameter for the second sensor array that enables the one or more second sensors to detect the item; or
            instruct the one or more second sensors to pause operation for a period of time.

2. The system of claim 1, wherein:
    the first sensor array is associated with optical sensors; and
    the second sensor array is associated with force sensors,
    wherein a power usage associated with the first sensor array is less than a power usage associated with the second sensor array.

3. The system of claim 1, wherein the controller, when detecting the event, is configured to:
    detect the event based on a change between the first sensor value and a previous sensor value satisfying a threshold.

4. The system of claim 3, wherein the event is associated with the item being removed from the smart shelf, the item being placed on the smart shelf, or the item being moved between locations on the smart shelf.

5. The system of claim 1, wherein the controller is configured to:
    identify the one or more second sensors based on a distance between the one or more second sensors and the first sensor satisfying a threshold.

6. The system of claim 1, wherein the controller is configured to:
    receive a plurality of first sensor values from a plurality of sensors of the first sensor array;
    detect, based on the plurality of first sensor values, a plurality of events that satisfies a threshold, wherein the plurality of events occur within a defined period of time; and
    activate the one or more second sensors of the second sensor array based on the detection of the plurality of events.

7. The system of claim 1, wherein the controller, when activating the one or more second sensors, is configured to:
    trigger the one or more second sensors to capture the second sensor values associated with the surface of the smart shelf, wherein the second sensor values are associated with a high item count accuracy as compared to first sensor values captured by the first sensor array.

8. The system of claim 7, wherein the controller is configured to:
    transmit, to a server, an alert that indicates information based on the second sensor values, wherein the information indicates a recommended number of items to place on the surface of the smart shelf based on the second sensor values.

9. The system of claim 1, wherein the controller is configured to:
    receive a plurality of first sensor values from a plurality of sensors of the first sensor array;
    detect, based on the plurality of first sensor values, a plurality of events that satisfies a threshold;
    determine that the plurality of events no longer satisfies the threshold; and
    activate the one or more second sensors after the plurality of events no longer satisfies the threshold.

10. The system of claim 1, wherein the controller is configured to:
    transmit, to a server, an alert indicating the occurrence of the event, wherein the alert indicates a recommendation to rearrange the item on the surface of the smart shelf based on the occurrence of the event.

11. The system of claim 1, wherein the first sensor array and the second sensor array are powered using a battery or harvested energy.

12. A method for activating sensors associated with a smart shelf, comprising:
    receiving, at a controller associated with a smart shelf, a first sensor value from a first sensor of a first sensor array associated with the smart shelf;
    detecting, at the controller, an occurrence of an event based on the first sensor value, wherein the event is associated with an item of the smart shelf;
    activating, by the controller and based on the occurrence of the event, one or more second sensors of a second sensor array associated with the smart shelf;
    receiving, at the controller from the one or more second sensors, second sensor values;

determining, by the controller from the second sensor values, that the one or more second sensors are unable to detect an item associated with the smart shelf; and performing, by the controller, one or more of:
configuring an updated dynamic range parameter for the second sensor array that enables the one or more second sensors to detect the item; or
instructing the one or more second sensors to pause operation for a period of time.

13. The method of claim 12, wherein:
the first sensor array is associated with optical sensors; and
the second sensor array is associated with force sensors,
wherein a power usage associated with the first sensor array is less than a power usage associated with the second sensor array.

14. The method of claim 12, wherein detecting the event comprises:
detecting the event based on a change between the first sensor value and a previous sensor value satisfying a threshold, wherein the event is associated with the item being removed from the smart shelf, the item being placed on the smart shelf, or the item being moved between locations on the smart shelf.

15. The method of claim 12, wherein the first sensor array and the second sensor array are powered using a battery or harvested energy.

16. A tangible machine-readable medium storing a set of instructions, the set of instructions comprising:
one or more instructions that, when executed by one or more processors of a device, cause the device to:
receive, at a controller associated with a smart shelf, an optical sensor value from an optical sensor of an optical sensor array;
detect, at the controller, an occurrence of an event based on a change between the optical sensor value and a previous sensor value satisfying a threshold;
activate, by the controller and based on the occurrence of the event, one or more force sensors of a force sensor array associated with the smart shelf, wherein the one or more force sensors are within a defined distance from the optical sensor;
receive, from the one or more force sensors, force sensor values;
determine, from the force sensor values, that the one or more force sensors are unable to detect an item associated with the smart shelf; and
perform one or more of:
configure an updated dynamic range parameter for the force sensor array that enables the one or more force sensors to detect the item; or
instruct the one or more force sensors to pause operation for a period of time.

17. The tangible machine-readable medium of claim 16, wherein the one or more instructions, when executed by the one or more processors, further cause the device to:
receive a plurality of optical sensor values from a plurality of optical sensors of the optical sensor array;
detect, based on the plurality of optical sensor values, a plurality of events that satisfies a threshold, wherein the plurality of events occur within a defined period of time; and
activate the one or more force sensors of the force sensor array based on the detection of the plurality of events.

18. The tangible machine-readable medium of claim 16, wherein the one or more instructions, that cause the device to activate the one or more force sensors, cause the device to:
trigger the one or more force sensors to capture the force sensor values associated with a surface of the smart shelf, wherein the force sensor values are associated with a high item count accuracy as compared to optical sensor values captured by the optical sensor array.

\* \* \* \* \*